United States Patent [19]

Bray

[11] Patent Number: 4,828,708

[45] Date of Patent: May 9, 1989

[54] SEMIPERMEABLE MEMBRANES

[75] Inventor: Donald T. Bray, Escondido, Calif.

[73] Assignee: Desalination Systems, Escondido, Calif.

[21] Appl. No.: 101,579

[22] Filed: Sep. 28, 1987

[51] Int. Cl.$^4$ ............................................. B01L 13/00
[52] U.S. Cl. ................................... 210/654; 210/490; 210/500.37; 427/245
[58] Field of Search .................... 210/654, 490, 500.28, 210/500.37; 427/245

[56] References Cited

U.S. PATENT DOCUMENTS 4,606,943 8/1986 Rak et al. ................... 210/500.28 X

Primary Examiner—Frank Spear
Attorney, Agent, or Firm—Fitch, Even, Tabin & Flannery

[57] ABSTRACT

A reverse osmosis membrane with excellent nitrate rejection that is particularly suitable for point-of-use drinking water purposes. The reverse osmosis membrane is a composite material comprising a porous support layer and an ultrathin polyamide desalinizing layer which is the interfacial condensation reaction product of (a) meta-phenylenediamine and (b) a mixture of a major portion of isophthaloyl chloride and a minor proportion of trimesoyl chloride.

8 Claims, 1 Drawing Sheet

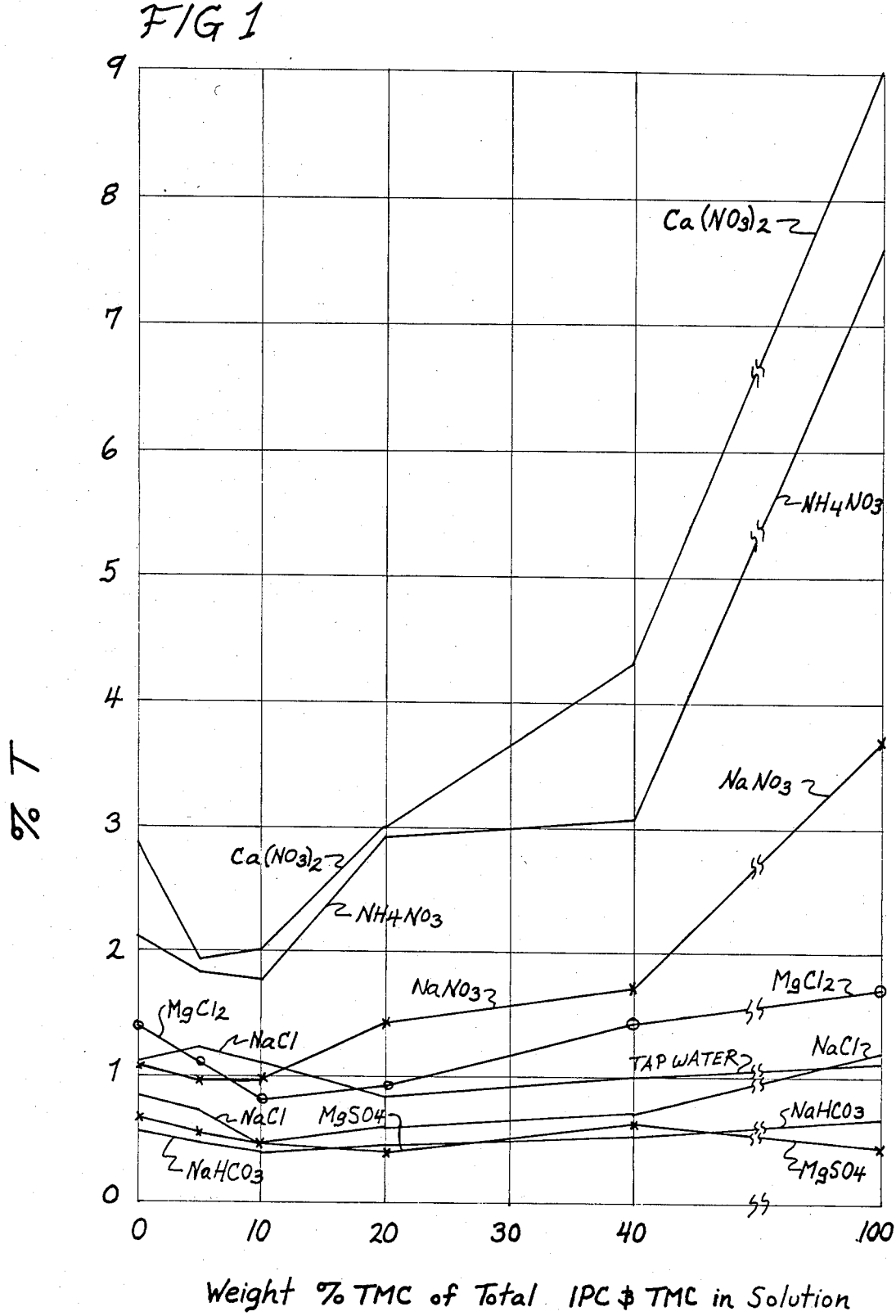

SEMIPERMEABLE MEMBRANES

The present invention relates to semipermeable membranes for use in reverse osmosis systems and, more particularly, to such membranes which are useful in removing specific contaminants.

BACKGROUND OF THE INVENTION

The preparation of synthetic polymeric membranes for use in reverse osmosis systems is well-known in the art. U.S. Pat. No. 4,277,344, for example, discloses a semipermeable membrane prepared from the reaction of an aromatic polyamine with a polyacyl halide which has been found to be effective in reverse osmosis systems directed at rejecting sodium, magnesium and calcium cations, and chlorine, sulfate and carbonate anions. Because these ions are found in seawater, these membranes are useful for desalinating seawater.

Whater systems containing nitrate salts, such as Ca(NO$_3$)$_2$ and NH$_4$NO$_3$, however, are not effectively desalinated by the these membranes or other generally available membranes. Because in various areas of the world, ground water supplies have become contaminated with nitrates from fertilizer runoff, stock feeding and other sources, there is a need for a desalination system directed at rejecting nitrate salts. Membranes for use in reverse osmosis systems to be commercially acceptable should be capable of relatively high flux rate and should have resistance to deterioration by hydrolyis and by exposure to high pressure, temperature and dissolved chlorine.

One object of the present invention to provide semipermeable membranes for use in reverse osmosis systems having improved rejection of certain salts, such as nitrates, while maintaining the necessary durability requirements needed for commercial applications.

SUMMARY OF THE INVENTION

It has been discovered that a membrane that is capable of an unexpectedly high nitrate rejection can be obtained by reacting an aromatic polyacyl halide with a bifunctional aromatic amine. The preferred polyacyl halide is isophthaloyl chloride (IPC) or a mixture of a major portion of isophthaloyl chloride and not more than about 40 mole percent of trimesoyl chloride (TPC), which is also sometimes called trimesitinoyl chloride. The preferred polyamine is meta-phenylenediamine (m-PDA).

The most suitable approach to a practical structure for use in reverse osmosis systems appears to be the formation of a composite comprising a porous support on which the polyamide membrane has been formed. The preferred method of preparing such a composite, permselective membrane comprises (a) treating a suitable microporous substrate with an aqueous solution of the polyamine, (b) contacting the resulting coated microporous substrate with the polyacyl halide dissolved in a non-polar organic liquid solvent so that condensation reactions occur on the surface of the microporous substrate, and (c) drying the composite permselective membrane at ambient or elevated temperatures.

BRIEF DESCRIPTION OF DRAWING

FIG. 1 is a plot of % of transmission (%T) versus weight % of TMC based upon total weight of IPC and TMC in the organic reactant phase from which the membrane was formed, based upon testing with aqueous feed solutions of a variety of different salts.

DETAILED DESCRIPTION OF THE PREFERRED EMBODIMENTS

Interfacial polymerization of essentially monomeric polyamine and monomeric polycarboxylic starting materials forms ultrathin polyamides having excellent salt rejection and flux characteristics. Starting materials should be carefully selected and should meet a number of criteria. First, both the polycarboxylic and polyamine monomers should be aromatic. Second, the starting materials should be relatively low in molecular weight, i.e., their aromatic nuclei are preferably monocyclic. Third, the amine functional groups of the polyamine should be primary amines. Fourth, the polyamine and polycarboxylic starting materials should be highly reactive toward each other under normal ambient temperature and atmospheric pressure. The polyacylhalide should not contain more than about 40 mole percent of a trifunctional acyl halide.

Utilizing those criteria, the present invention basically preferably combines isophthaloyl chloride (IPC) with meta-phenylenediamine (m-PDA) as a part of the following condensation reaction:

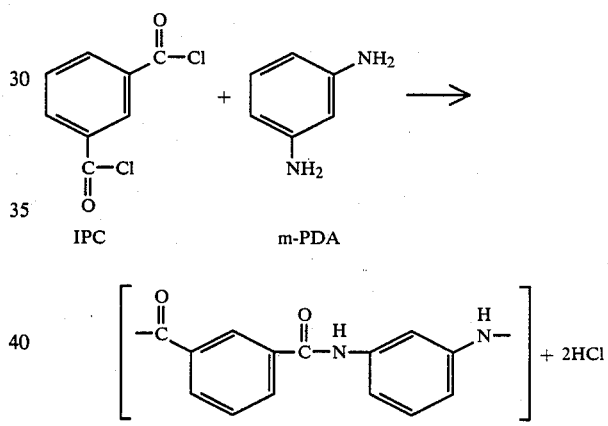

IPC may constitute all or a major portion of the polyacyl halide. Preferably a mixture of about 60 to 95% by weight IPC is used, with the remainder TMC, and most preferably the mixture contains between about 80 to 90 weight % IPC.

This reaction is most easily effected in an interfacial arrangement where a non-polar solvent containing IPC is allowed to contact an aqueous phase containing m-PDA, with the resulting membrane being applied to a porous polysulfone support. Another preferred method of interfacial contact is to coat the polysulfone support with an aqueous solution of m-PDA, thereby providing a thin film of aqueous medium for the interfacial reaction. The non-polar solvent containing IPC can then be brought into contact with this thin film, and the reaction will then proceed on the porous support to form an ultrathin membrane, e.g. having a thickness below 1 micron.

Non-polar solvents well suited for this reaction are hydrocarbons, such as C$_5$-C$_8$ alkanes and naphthas, chlorocarbons and fluorocarbons which do not dissolve or plasticize the polysulfone support.

The above-described interfacial techniques are well developed in the art and are exemplified by the following example which provides resulting membranes embodying the unexpected results of this invention.

EXAMPLE I

Polyamide membranes were made with m-PDA and varying relative percentages of IPC and TMC by casing an interfacial membrane on a porous polysulfone support. Table 1 shows the weight % TMC in the IPC/TMC mixture.

TABLE 1

| Sample | weight % TMC of total IPC & TMC |
|---|---|
| D001-0 | 0 |
| D001-5 | 5 |
| D001-10 | 10 |
| D001-20 | 20 |
| D001-40 | 40 |
| S1073 | 100 |
| S1015 | 100 |

The concentration of m-PDA in the aqueous solvent was held constant for making all samples at 0.3 wt. %. The total IPC +TMC concentration in the organic solvent, which was Chevron 353-B (which chemically is a grade of naptha), was held constant at 0.1% in all samples.

The contact time for the interfacial reaction was about 10 seconds; however, the reaction was substantially complete in less than 1 second. The resulting polysulfone/polyamide composite was air-dried. The samples were tested using a succession of various feeds in a closed loop system at about 100 psig and 70° F., and the recorded data was normalized to 100 psig net and 75° F. using known variances from the measured values. The initial and the final tests were carried out using tap water (TW); in between, testing of a succession of aqueous solutions of the salts specified hereinafter is carried out, each at a concentration of 0.2 weight percent in demineralized water. Tables 2A and 2B report the % transmission (%T) and water flux constant (A) obtained by testing the various samples. The flux constant is measured in gms/cm2-sec-atm $\times 10^{-5}$, and the percent transmission is measured by a conductivity meter, comparing the infeed and the permeate flow.

TABLE 2A

| | D001-0 | | D001-05 | | D001-10 | | D001-20 | |
|---|---|---|---|---|---|---|---|---|
| FEED | A | % T | A | % T | A | % T | A | % T |
| TW | 1.09 | 1.1 | 1.60 | 1.2 | 2.14 | 1.1 | 2.94 | 0.84 |
| NaCl | .94 | 0.62 | 1.40 | 0.53 | 2.02 | 0.42 | 2.67 | 0.60 |
| NaNO3 | 0.91 | 1.08 | 1.32 | 0.99 | 1.89 | 0.97 | 2.56 | 1.44 |
| NH4NO3 | 0.95 | 2.16 | 1.39 | 1.84 | 2.03 | 1.76 | 2.83 | 2.97 |
| CaNO3 | 0.85 | 2.9 | 1.26 | 1.9 | 1.81 | 2.0 | 2.56 | 3.0 |
| NaHCO3 | 0.76 | 0.56 | 1.16 | 0.47 | 1.70 | 0.40 | 2.62 | 0.45 |
| MgSO4 | 0.80 | 0.81 | 1.24 | 0.71 | 1.83 | 0.42 | 2.60 | 0.41 |
| MgCl2 | 0.79 | 1.4 | 1.23 | 1.1 | 1.86 | 0.79 | 2.74 | 0.87 |
| TW | 0.88 | 1.4 | 1.34 | 1.3 | 2.08 | 0.84 | 2.94 | 0.88 |
| Avg. A | 0.89 | | 1.33 | | 1.93 | | 2.72 | |

TABLE 2B

| | D001-40 | | S1073 | | S1015 | |
|---|---|---|---|---|---|---|
| FEED | A | % T | A | % T | A | % T |
| TW | 3.76 | 0.98 | 3.43 | 1.1 | 6.99 | 0.81 |
| NaCl | 3.68 | 0.71 | 2.96 | 1.2 | 6.70 | 0.83 |
| NaNO3 | 3.55 | 1.7 | 2.90 | 3.7 | 5.90 | 6.1 |
| NH4NO3 | 3.87 | 3.07 | 3.40 | 7.6 | 6.96 | 7.3 |
| CaNO3 | 3.49 | 4.3 | 3.23 | 9.0 | 6.01 | 8.9 |
| NaHCO3 | 3.65 | 0.53 | 3.67 | 0.65 | 6.19 | 0.59 |
| MgSO4 | 3.56 | 0.61 | 3.34 | 0.37 | 6.01 | 0.39 |
| MgCl2 | 3.59 | 1.4 | 3.38 | 1.7 | 5.93 | 1.3 |

TABLE 2B-continued

| | D001-40 | | S1073 | | S1015 | |
|---|---|---|---|---|---|---|
| FEED | A | % T | A | % T | A | % T |
| TW | 4.13 | 1.1 | 3.98 | 1.5 | 7.38 | 0.82 |
| Avg. A | 3.70 | | 3.37 | | 6.45 | |

It can be seen from the test results that membranes made from a major proportion of the difunctional acyl chloride and a minor proportion of the trifunctional acyl chloride, i.e., TMC, show unexpectedly lower %T, with the optimum for nitrate removal being generally between about 10 and 20%. FIG. 1 graphically illustrates this drastic improvement in nitrate removal, as well as some rejection improvement for several other salts at these TMC levels.

The membranes designated S1073 and S1015 are representative of the best membranes for nitrate removal on the commercial market at the present time which generally follow the teaching of the '344 patent, the disclosure of which is incorporated herein by reference. This comparison illustrates the marked improvement now available in reverse osmosis nitrate removal systems by employing the membranes of this invention. Although the membranes which exhibit this greatly improved nitrate removal also exhibit a somewhat lowered flux, the A values for membranes in the 10 to 20% TMC range are satisfactory for use in point-of-use drinking water systems.

The above testing illustrates certain unexpected and beneficial features of membranes made according to the present invention. Although the subject membranes are especially useful for point-of-use drinking water systems, the present invention is not limited to such use and extends to other reverse osmosis systems utilizing these semipermeable membranes. Although the invention has been illustrated and described with regard to certain particularly preferred embodiments, it should be understood that changes and modifications as would be obvious to one having the ordinary skill in the art may be made without deviating from the scope of the invention which is set forth in the appended claims.

Particular features of the invention are emphasized in the following claims.

What is claimed is:

1. A sheet-like composite membrane suitable for separating water from aqueous solutions containing nitrate comprising a microporous support layer and, supported thereon, a water permeable, interfacially polymerized, ultrathin polyamide desalinizing layer, said desalinizing layer comprising the interfacial condensation reaction product of
   (a) a bifunctional monocyclic aromatic amine; and
   (b) a mixture containing at least about 80 % by weight of isophthaloyl chloride and at least about 5% by weight of trimesoyl chloride.

2. A composite membrane according to claim 1 wherein said aromatic amine is meta-phenylenediamine.

3. A composite membrane according to claim 1 wherein said desalinizing layer is the reaction produce of meta-phenylenediamine and a mixture of about 80 to 90 % isophthaloyl chloride and about 10 to 20% by weight of trimesoyl chloride.

4. A process for the preparation of a composite reverse osmosis membrane which is suitable for separating water from aqueous solutions containing nitrate comprising the steps of:

(a) coating a porous support with a liquid layer comprising an aqueous solution containing a bifunctional monocyclic aromatic amine;
(b) contacting the said liquid layer with a non-polar liquid organic solvent containing, dissolved therein, a mixture containing at least about 90 % by weight of isophthaloyl chloride and at least about 5% by weight of trimesoyl chloride; and
(c) drying the product of step (b).

5. A method according to claim 4 wherein said bifunctional aromatic amine is meta-phenylenediamine.

6. A method according to claim 5 wherein between about 10 and about 20 weight % trimesoyl chloride is present based upon total weight of acyl chloride.

7. A process for the treatment of an aqueous solution containing nitrate to substantially reduce the nitrate content thereof by contacting the aqueous nitrate solution under pressure with a reverse osmosis membrane, wherein the improvement comprises employing a membrane which includes the interfacial condensation reaction product of:
(a) a bifunctional monocyclic aromatic amine; and
(b) a mixture containing at least about 80 % by weight of isophthaloyl chloride and at least about 5% by weight of trimesoyl chloride.

8. A process according to claim 7 wherein said desalinizing layer is the reaction product of meta-phenylenediamine and a mixture of about 80 to 90 weight % of isophthaloyl chloride and about 10 to 20 weight % of trimesoyl chloride.

* * * * *

UNITED STATES PATENT AND TRADEMARK OFFICE
CERTIFICATE OF CORRECTION

PATENT NO. : 4,828,708

DATED : May 9, 1989

INVENTOR(S) : Donald T. Bray

It is certified that error appears in the above-identified patent and that said Letters Patent is hereby corrected as shown below:

Column 1, line 20, Change "Whater" to --Water--.

Column 1, line 30, Change "hydrolyis" to --hydrolysis--.

Column 3, line 6, Change "casing" to --casting--.

Column 3, line 41, Change "cm2-sec-atm" to --$cm^2$-sec-atm--.

Column 4, line 61, Change "produce" to --product--.

Signed and Sealed this

Twentieth Day of February, 1990

*Attest:*

JEFFREY M. SAMUELS

*Attesting Officer*     *Acting Commissioner of Patents and Trademarks*